US012649475B2

(12) United States Patent
Bakhchina et al.

(10) Patent No.: US 12,649,475 B2
(45) Date of Patent: Jun. 9, 2026

(54) DRIVER PSYCHOPHYSIOLOGICAL STATE DETECTION

(71) Applicant: Harman International Industries, Incorporated, Stamford, CT (US)

(72) Inventors: Anastasiya Vladimirovna Bakhchina, Nizhniy Novgorod (RU); Ivan Sergeevich Shishalov, Nizhniy Novgorod (RU); Mariya Yurievna Nevaykina, Nizhny Novgorod (RU); Anton Konstantinovich Yakimov, Nizhny Novgorod (RU); Anton Sergeevich Devyatkin, Nizhny Novgorod (RU); Mikhail Sergeevich Sotnikov, Nizhny Novgorod (RU); Andrey Viktorovich Filimonov, Bogorodskiy ray (RU); Vladimir Vladimirovich Borzikov, Yerevan (AM)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 118 days.

(21) Appl. No.: 18/622,677

(22) Filed: Mar. 29, 2024

(65) Prior Publication Data

US 2024/0326829 A1 Oct. 3, 2024

(30) Foreign Application Priority Data

Mar. 30, 2023 (RU) ........................... RU2023107737

(51) Int. Cl.
| | |
|---|---|
| *B60W 40/09* | (2012.01) |
| *B60W 50/14* | (2020.01) |
| *B60W 40/08* | (2012.01) |

(52) U.S. Cl.
CPC ............ *B60W 40/09* (2013.01); *B60W 50/14* (2013.01); *B60W 2040/0818* (2013.01);
(Continued)

(58) Field of Classification Search
CPC ................. B60W 40/09; B60W 50/14; B60W 2040/0818; B60W 2040/0872;
(Continued)

(56) References Cited

U.S. PATENT DOCUMENTS

| | | | |
|---|---|---|---|
| 2010/0109881 A1* | 5/2010 | Eskandarian | ........ B60K 28/066 340/576 |
| 2019/0077409 A1* | 3/2019 | Zandi | ...................... G06F 3/013 |

(Continued)

OTHER PUBLICATIONS

Liao, Y. et al., "Detection of Driver Cognitive Distraction: A Comparison Study of Stop-Controlled Intersection and Speed-Limited Highway," IEEE Transactions on Intelligent Transportation Systems, vol. 17, No. 6, Jan. 12, 2016, 10 pages.

(Continued)

*Primary Examiner* — Ryan W Sherwin
(74) *Attorney, Agent, or Firm* — McCoy Russell LLP

(57) ABSTRACT

It is herein disclosed a method of collecting data for determining a psychophysiological state of a human driver, comprising collecting data throughout a driving session, wherein the driving session comprises driving on a predetermined route by a driver in an automotive vehicle, wherein the predetermined route is divided into a plurality of route sections comprising a first route section having a first driving environment and a second route section having a second environment, wherein one of the first and second driving environments is a higher-complexity driving environment and the other of the first and second driving environments is a lower-complexity driving environment; wherein the driving session comprises a plurality of driving breaks, each break following immediately after driving in a (Continued)

respective route section is complete, wherein during each driving break a respective detection response task (DRT) is performed by the driver.

16 Claims, 6 Drawing Sheets

(52) U.S. Cl.
CPC ............... *B60W 2040/0872* (2013.01); *B60W 2540/215* (2020.02); *B60W 2540/22* (2013.01); *B60W 2540/221* (2020.02); *B60W 2540/229* (2020.02); *B60W 2556/10* (2020.02)

(58) Field of Classification Search
CPC ....... B60W 2540/215; B60W 2540/22; B60W 2540/221; B60W 2540/229; B60W 2556/10; A61B 5/024; A61B 5/0816; A61B 5/163; A61B 5/165; A61B 5/18; A61B 5/0048; A61B 5/0205; A61B 5/162
See application file for complete search history.

(56) References Cited

U.S. PATENT DOCUMENTS

| | | | |
|---|---|---|---|
| 2020/0151474 A1* | 5/2020 | Zandi | ...................... G06F 3/013 |
| 2022/0095975 A1* | 3/2022 | Aluf | ....................... A61B 3/113 |
| 2022/0203996 A1* | 6/2022 | Katz | ..................... B60W 50/14 |

OTHER PUBLICATIONS

Nilsson, E. et al., "On-to-off-path gaze shift cancellations lead to gaze concentration in cognitively loaded car drivers: A simulator study exploring gaze patterns in relation to a cognitive task and the traffic environment," Transportation Research Part F: Traffic Psychology and Behaviour, vol. 75, Nov. 2020, Available Online Oct. 13, 2020, 15 pages.
European Patent Office, Extended European Search Report Issued in Application No. 23202165.9, Apr. 4, 2024, Germany, 8 pages.

* cited by examiner

120

130

300 collecting data throughout a driving session, wherein the driving session comprises driving on a predetermined route by a driver in an automotive vehicle, wherein the predetermined route is divided into a plurality of route sections comprising a first route section having a first driving environment and a second route section having a second environment, wherein one of the first and second driving environments is a higher-complexity driving environment and the other of the first and second driving environments is a lower-complexity driving environment;

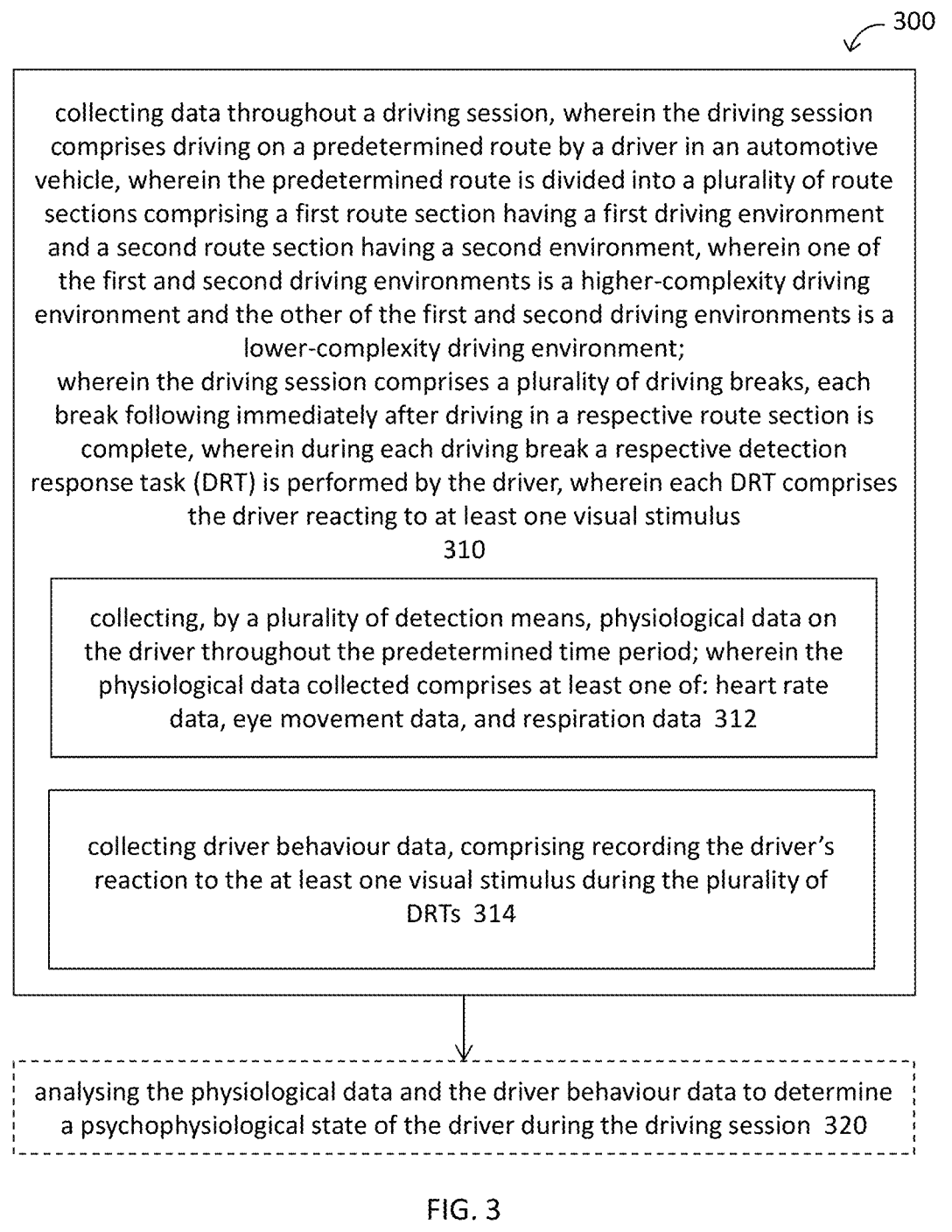

wherein the driving session comprises a plurality of driving breaks, each break following immediately after driving in a respective route section is complete, wherein during each driving break a respective detection response task (DRT) is performed by the driver, wherein each DRT comprises the driver reacting to at least one visual stimulus

310 collecting, by a plurality of detection means, physiological data on the driver throughout the predetermined time period; wherein the physiological data collected comprises at least one of: heart rate data, eye movement data, and respiration data 312 collecting driver behaviour data, comprising recording the driver's reaction to the at least one visual stimulus during the plurality of DRTs 314 analysing the physiological data and the driver behaviour data to determine a psychophysiological state of the driver during the driving session 320

FIG. 3

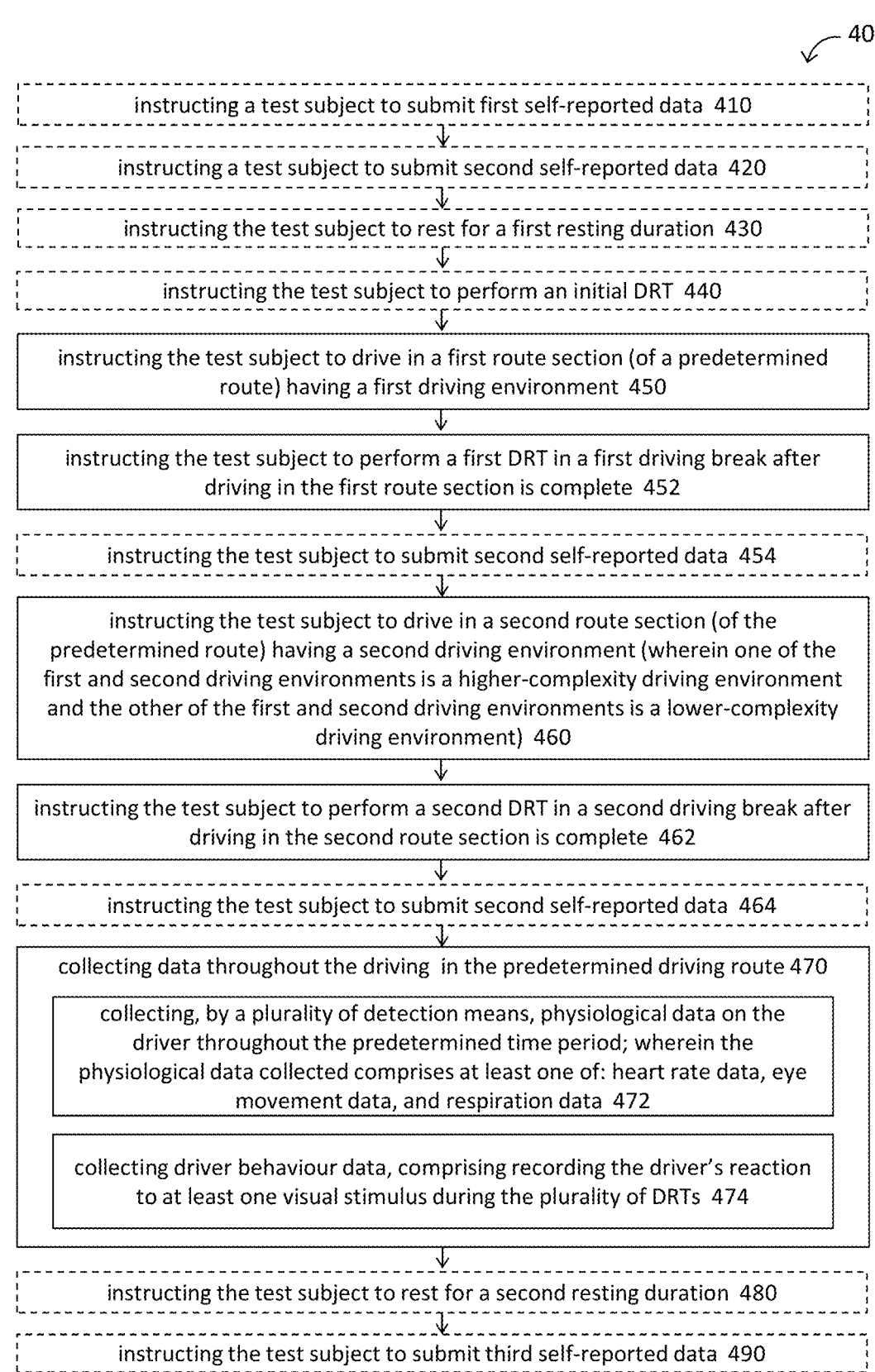

400 instructing a test subject to submit first self-reported data 410 instructing a test subject to submit second self-reported data 420 instructing the test subject to rest for a first resting duration 430 instructing the test subject to perform an initial DRT 440 instructing the test subject to drive in a first route section (of a predetermined route) having a first driving environment 450 instructing the test subject to perform a first DRT in a first driving break after driving in the first route section is complete 452 instructing the test subject to submit second self-reported data 454 instructing the test subject to drive in a second route section (of the predetermined route) having a second driving environment (wherein one of the first and second driving environments is a higher-complexity driving environment and the other of the first and second driving environments is a lower-complexity driving environment) 460 instructing the test subject to perform a second DRT in a second driving break after driving in the second route section is complete 462 instructing the test subject to submit second self-reported data 464 collecting data throughout the driving in the predetermined driving route 470 collecting, by a plurality of detection means, physiological data on the driver throughout the predetermined time period; wherein the physiological data collected comprises at least one of: heart rate data, eye movement data, and respiration data 472 collecting driver behaviour data, comprising recording the driver's reaction to at least one visual stimulus during the plurality of DRTs 474 instructing the test subject to rest for a second resting duration 480 instructing the test subject to submit third self-reported data 490

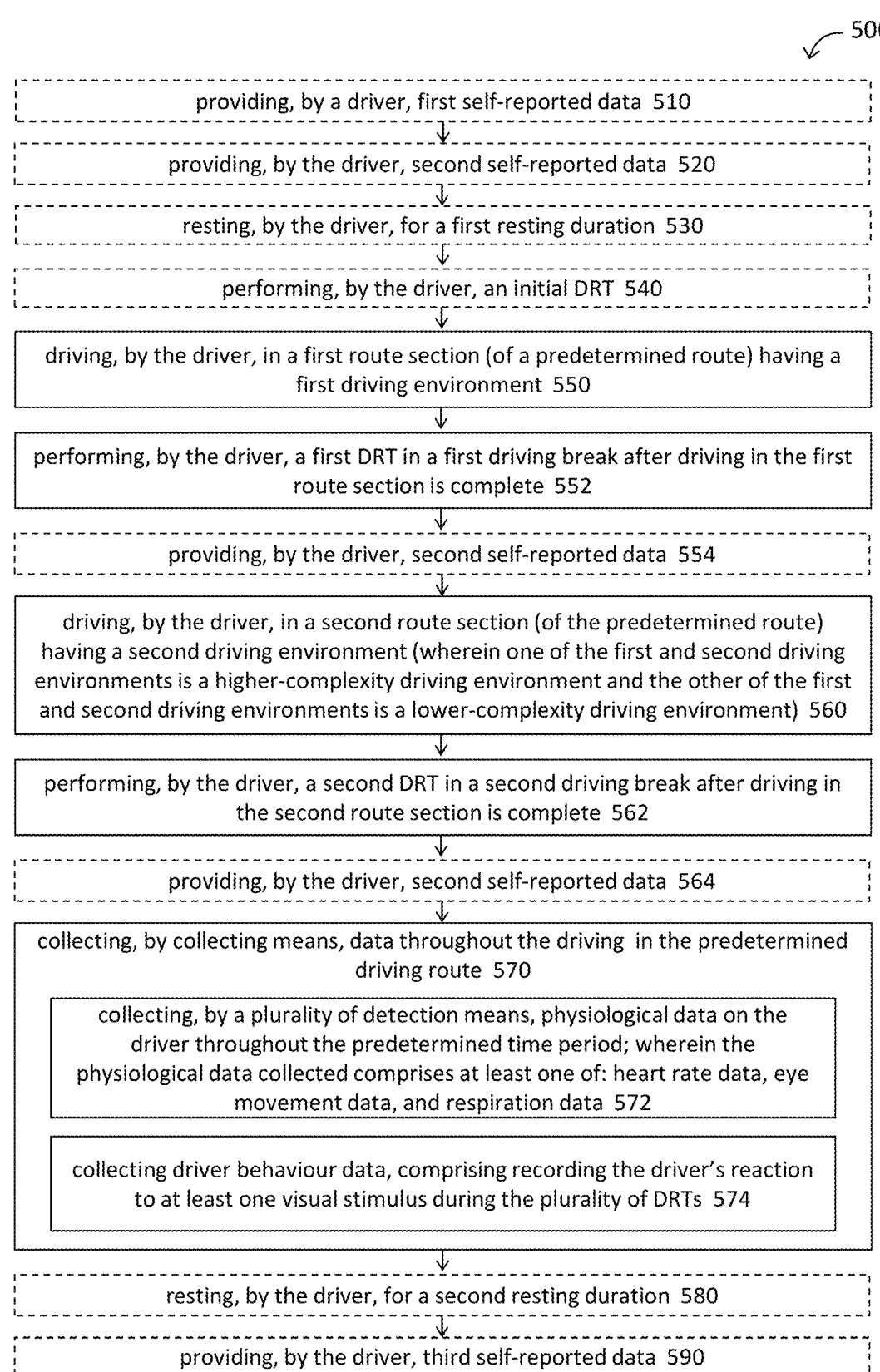

providing, by a driver, first self-reported data  510 providing, by the driver, second self-reported data  520 resting, by the driver, for a first resting duration  530 performing, by the driver, an initial DRT  540 driving, by the driver, in a first route section (of a predetermined route) having a first driving environment  550 performing, by the driver, a first DRT in a first driving break after driving in the first route section is complete  552 providing, by the driver, second self-reported data  554 driving, by the driver, in a second route section (of the predetermined route) having a second driving environment (wherein one of the first and second driving environments is a higher-complexity driving environment and the other of the first and second driving environments is a lower-complexity driving environment)  560 performing, by the driver, a second DRT in a second driving break after driving in the second route section is complete  562 providing, by the driver, second self-reported data  564 collecting, by collecting means, data throughout the driving  in the predetermined driving route  570 collecting, by a plurality of detection means, physiological data on the driver throughout the predetermined time period; wherein the physiological data collected comprises at least one of: heart rate data, eye movement data, and respiration data  572 collecting driver behaviour data, comprising recording the driver's reaction to at least one visual stimulus during the plurality of DRTs  574 resting, by the driver, for a second resting duration  580 providing, by the driver, third self-reported data  590

DRIVER PSYCHOPHYSIOLOGICAL STATE DETECTION

CROSS REFERENCE TO RELATED APPLICATIONS

The present application claims priority to Russia Patent Application No. 2023107737, entitled "DRIVER PSYCHO-PHYSIOLOGICAL STATE DETECTION", and filed on Mar. 30, 2023. The entire contents of the above-listed application is hereby incorporated by reference for all purposes.

TECHNICAL FIELD

Aspects of the present disclosure relate to advanced driver assistance systems (ADAS) and monitoring of human cognitive workload in the automotive industry.

BACKGROUND

Data plays an essential role in many machine learning-related projects, and is particularly needed in developing ADAS in the automotive industry. Research is carried out to investigate human engagement to driving conditions, through careful planning and/or control of lab-based or real-life driving experiments, detecting what mental effort is required of and applied by a human being for road-related cognition and other aspects of cognition, when driving. It is important to compile a large volume of data on human drivers' psychophysiological states and cognitive workloads while driving under monitored or controlled road conditions, environment conditions, levels of distraction, etc., that could be analysed in order to develop a driving monitoring systems in smart vehicles, for example.

The way in which such data is gathered needs to be thoroughly planned and carefully controlled. In previously known driving data collection experiments, biases can easily be inadvertently introduced, affecting the reliability of the data; processing and analysis of the data may become difficult or impossible, and no meaningful results may be derived.

There is therefore recognised a need to provide a new and optimised structure, protocol, and/or scenario for in-car, on-road data collection sessions (as opposed to simulations), for the sake of building a system for human psychophysiological state detection during driving and associated research.

SUMMARY

Through a process of optimisation that takes into account limitations imposed by engineering, human psychology and physiology, and resource management, a preferred way of carrying out consistent experiments to collect the psychophysiological state of a driver during driving has been developed by inventors, and described as follows.

In accordance with one of the aspects of the present disclosure, there is provided a method of collecting data for determining a psychophysiological state of a human driver, comprising: collecting data throughout a driving session, wherein the driving session comprises driving on a predetermined route by a driver in an automotive vehicle, wherein the predetermined route is divided into a plurality of route sections comprising a first route section having a first driving environment and a second route section having a second environment, wherein one of the first and second driving environments is a higher-complexity driving environment and the other of the first and second driving environments is a lower-complexity driving environment; wherein the driving session comprises a plurality of driving breaks, each break following immediately after driving in a respective route section is complete, wherein during each driving break a respective detection response task (DRT) is performed by the driver, wherein each DRT comprises the driver reacting to at least one visual stimulus; wherein said collecting data comprises: collecting, by a plurality of detection means, physiological data on the driver throughout the predetermined time period; wherein the physiological data collected comprises at least one of: heart rate data, eye movement data, and respiration data; and collecting driver behaviour data, comprising: recording the driver's reaction (i.e. the manner in which the driver reacts) to the at least one visual stimulus during the plurality of DRTs.

Preferably, the plurality of route sections further comprises a third route section having a third driving environment, wherein the third driving environment is an intermediate-complexity driving environment. Optionally, the plurality of route sections additionally comprises a fourth route section having a fourth driving environment, wherein the fourth driving environment is a higher-complexity driving environment, an intermediate-complexity driving environment or a lower-complexity driving environment.

Preferably, the high-complexity driving environment is an urban environment, and the lower-complexity driving environment is a highway environment.

Preferably, the each DRT comprises the driver reacting to the at least one visual stimulus as soon as possible, and wherein said recording the driver's reaction comprises at least one of: recording a response time of the user in reaction to the visual stimulus, a number of correct responses, and a number of incorrect responses. Preferably, in each DRT the driver reacts to the at least one visual stimulus by physically pressing a button. Preferably, in at least one of the plurality of DRTs, at least one false stimulus is provided to the driver that the driver is instructed to ignore; wherein, preferably, the visual stimulus comprises a visual indication in a first colour, and the false stimulus comprises a visual indication in a second colour different from the first colour.

Preferably, a duration to complete driving in each of the plurality of route sections is between 10 and 20 minutes, and/or wherein each of the plurality of DRTs has a duration of between 2 and 3 minutes.

Preferably, an initial DRT is performed before driving begins.

Preferably, the driving session takes place after a first period of rest by the driver for a first predetermined duration, and a second period of rest by the driver for a second predetermined duration takes place after the driving session.

Preferably, the method further comprises: collecting self-reported data from the driver in each of the driving breaks, preferably after the respective DRT in each driving break, the self-reported data comprising data on at least one of: the driver's psychological state, physical state and prior sleep conditions; preferably, the self-reported data is provided by the driver in the form of at least one questionnaire. Preferably, collecting self-reported data comprises: collecting further self-reported data before the first period of rest and after the second period of rest.

Optionally, the method further comprises, before said collection of data, selecting a suitable route comprising multiple sections of different environments corresponding to different levels of complexities based on previously collected data on a plurality of potential routes.

Preferably, the plurality of detection means comprises at least one of: ECG apparatus for obtaining heart rate data, at least one eye-tracking camera for obtaining eye movement data, at least one camera for obtaining video data of the driver's face, and at least one photoplethysmography sensor to collect blood circulation data.

The method further comprises, optionally: analysing the physiological data and the driver behaviour data (and optionally the self-reported data) to determine a psycho-physiological state of the driver during the driving session; and/or analysing the physiological data and driver behaviour data through storing the collected data in a memory and/or sending the collected data to a processor for analysis; and/or storing results of the analysis and the collected physiological data and the collected driving behaviour data in a database and using the database as training data for a machine-learning algorithm to predict or estimate the psychological state of a driver when driving.

In accordance with another one of the aspects of the present disclosure, a system for collecting data for determining a psychophysiological state of a human driver, comprising: means for collecting data throughout a driving session, wherein the driving session comprises driving on a predetermined route by a driver in an automotive vehicle, wherein the predetermined route is divided into a plurality of route sections comprising a first route section having a first driving environment and a second route section having a second environment, wherein one of the first and second driving environments is a higher-complexity driving environment and the other of the first and second driving environments is a lower-complexity driving environment; wherein the driving session comprises a plurality of driving breaks, each break following immediately after driving in a respective route section is complete, wherein during each driving break a respective detection response task (DRT) is performed by the driver, wherein each DRT comprises the driver reacting to at least one visual stimulus; wherein the means for collecting data comprises: a plurality of detection means for collecting physiological data on the driver throughout the predetermined time period; wherein the physiological data collected comprises at least one of: heart rate data, eye movement data, and respiration data; and means for collecting driver behaviour data, comprising: recording the driver's reaction to the at least one visual stimulus during the plurality of DRTs.

BRIEF DESCRIPTION OF THE DRAWINGS

FIG. 3 is a flow chart for a method in accordance with an example.

FIG. 4 is a flow chart for a method in accordance with another example.

FIG. 5 is a flow chart for a method in accordance with another example.

DETAILED DESCRIPTION OF THE INVENTION

Figure 1A:
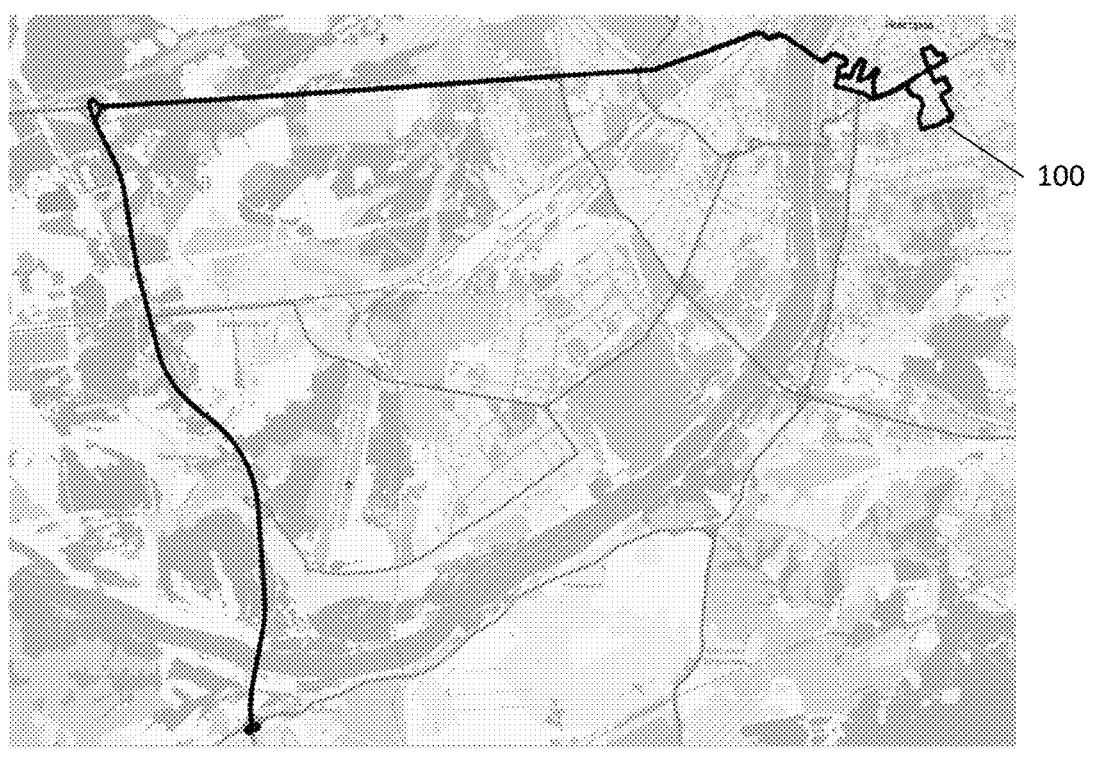
FIGS. 1A to 1D are map illustrations showing parts of an exemplary driving route in accordance with an example.

It is herein disclosed a method or protocol for sessions conducted to consistently generate and collect data in relation to a human test subject when driving. Controlled data collection during real on-road driving sessions are intended to validate results developed from simulation-based tests, and also to help development of and validation of the simulation experiments and systems themselves.

The protocol is also designed to achieve the exploration of mental effort and loads without making data collection dangerous for the driver.

A test session may be structured in three parts: an introductory phase comprising preparatory actions, such as letting the subject wear monitoring equipment (e.g. an ECG monitor); the main bulk of the experiment comprising a sequence of data collection phases; and a concluding phases comprising post-experiment actions, such as helping the subject take off monitoring equipment.

This field study/experiment is to be performed with a real automotive vehicle rather than a specially built car simulator. The vehicle may be an instrumented vehicle but otherwise as close to a "real life" vehicle as possible: configuration of the vehicle, and the route(s) that the driver needs to follow, may be required.

In the main data-collection phase of the experiment itself, various data relating to the human subject's psychophysiological state (e.g. level of alertness, mental/cognitive load) is collected, by sensing/monitoring/data-collection means. These typically involve sensors/detectors/monitors that attached to the subject's body to collect bio-signals, and those that are located in the subject's environment.

In carrying out sessions consistently and carefully according to a pre-defined protocol, reliable data can be assembled for exploring human psychological and physiological states when engaged in driving a vehicle in connection with environmental and road conditions, useful in the automotive industry and beyond. Such data can illuminate the levels and types of cognitive load induced by driving and internal cognition, stress induced by the same, and levels of drowsiness (or of alertness).

A testing protocol in a simulated driving environment is now described with respect to an exemplary embodiment. It has been identified by the inventors to be an optimum protocol, in terms of balancing various factors and constraints, including demands on the test subject (he will be overly tired in an overly long experiment), need for sufficient and reliable data (the experiment cannot be too short because sufficient volumes of data needs to be collected, and also because human mental states normally takes time to change), limitations on the equipment (e.g. configuration or processing time required outside and inside of the experiment duration), cost of running an experiment (an unnecessarily long experiment wastes resources).

Possible variations in the protocol are discussed. Different aspects, elements and preferences for each type or category of experimental protocols disclosed herein may be combined or interchanged; all logical combinations and changes of elements and aspects between examples are considered to be within the scope of disclosure.

Driving and Cognitive Tests

One or more driving route(s) are selected to be used in a data collection driving session, prior to the beginning of the session.

Preferably, the route includes therewithin different environment conditions, preferably in different stages. For example, the different environments or stages comprise: urban driving, mixed urban and highway driving, highway driving. The varied environments and stages, differing in terms of their environmental complexity, reflect different levels of cognitive loads imposed on or required from the driver driving through them. Urban driving is an example of an environment where conditions are relatively complex, with more features and obstacles such as traffic lights, crossings, other vehicles, pedestrians for instance, such as in the heart of a large city/downtown, where the driver is required to make relatively more use of decision-making faculties and thus experiences a greater cognitive load. Highway driving is an example of an environment where conditions are relatively simple and monotonous with fewer such features and obstacles for instance, such as on an interstate highway (or more generally on wide straight roads with low traffic), where the driver is required to make relatively less use of decision-making faculties and thus experiences a smaller cognitive load. So-called mixed driving is when the driving conditions fall with the two extremes mentioned, such as in the outer zones/suburban areas of a city or a quiet town. In other words, the aforementioned urban, mixed, and highway environments are examples of a set of a higher-complexity environment, an intermediate-complexity environment, and a lower-complexity environment, relatively speaking. The inclusion of such varied environments, preferably in stages, in a single driving route would render a route suitable or preferable for performing the on-road test in accordance with the present protocol. A route appropriate for the purposes of this experiment may not always be found in every location.

The number of stages or route sections that a suitable route may be divided into may be other than 3, such as 2, 4 or 5. Preferably, the number of sections is at least 3 as the overall driving task is more broken down for the driver so he (or she) is less likely to feel tired. Similarly, in order to avoid extreme tiredness, the length of driving in each section is preferably not too long, preferably about 15 minutes at or near the driving speed limit.

Figure 1B:
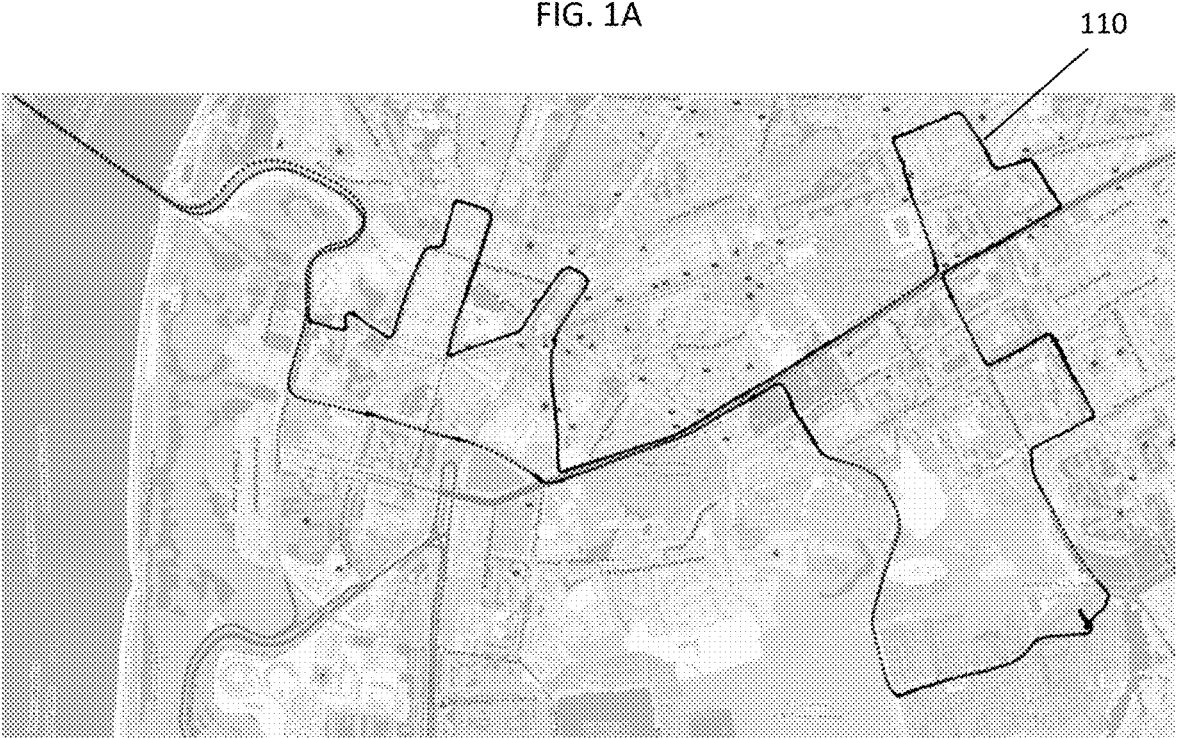
Figure 1C:
Figure 1D:
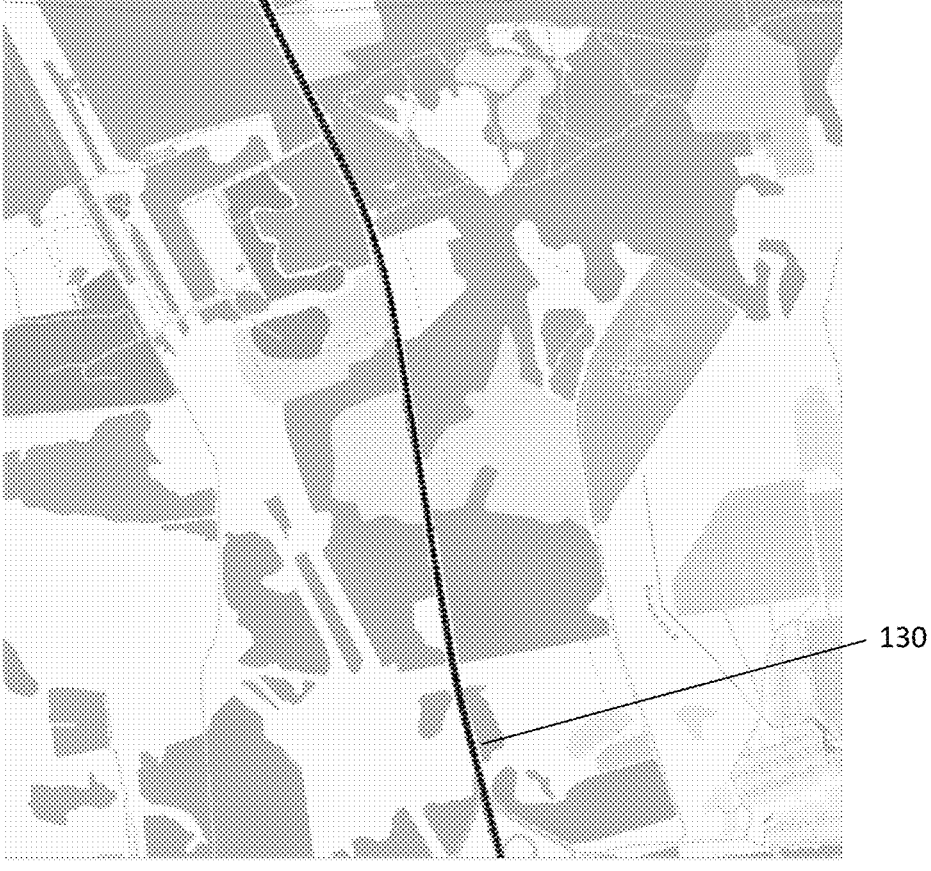

FIGS. 1A to 1D show an example of a route 100 identified for use in the experiments. FIG. 1A shows the whole route 100 from beginning to end; FIG. 1B shows an urban part 110 of the route; FIG. 1C shows a mixed-urban-and-highway part 120 of the route; FIG. 1D shows a highway-part 130 of the route.

As real cars and real driving are utilised in the experiments performed in accordance with the presently disclosed protocol, it can mean there is real accident risk and a higher motivation on the driver's part (i.e. strategic level criteria) compared to a lab-based, simulation environment. Preferably the test route(s) is/are fixed for consistency between experiments, but compared to simulated experiments there can be more unpredictable aspects, where events and factors not under experimental control come into play, such as the behaviour of other traffic participants, adverse weather conditions, and unexpected road constructions.

After preparation procedures are completed, the participant is instructed to drive along a certain route, stopping at pre-defined checkpoints. He (or she) is preferably alone in the car while driving. On the stops, he is preferably instructed to perform a cognitive test (e.g. a DRT), and fill out one or more questionnaires. Before the driving starts and after the final stop, there are preferably resting periods. The driver may be asked to sit quietly, and listen to a sound recording, such as one of sounds of a waterfall to relax. During driving, he is preferably prohibited from listening to music, using the phone, smoking, drinking, eating or chewing gum. He is preferably instructed to drive carefully in view of current weather conditions and follow road rules e.g. not go above the speed limit.

During driving, the participant preferably follows directions provided by a navigation system in the car. The experiment is preferably conducted at a time when the risk of congestion is very low, preferably outside of rush hours. The participant may drive along the route once in each direction assuming the route comprises two lanes in opposite directions, or repeat only one or more section of the route. Various aspects of a route such as its width in various parts, the presence of entrances and exits, and potential sites for checkpoints at which to stop, may be taken into account when looking for and deciding on the suitability of a test route.

After stopping at a checkpoint, the participant may be required to answer the question "Have you stopped?". Preferably, after a positive answer is provided, a DRT is initiated. These attention tests may serve as mental exercises that require instances of active decision-making (as opposed to an intuitive/unconscious reaction), revealing information on the driver's cognitive load, through reaction times, and the frequency of correct and incorrect responses, for example.

In a DRT, the task for the participant is to react in a certain way as soon as possible to a stimulus. In an exemplary DRT, this stimulus may take the form of a visual indication, such as a green light bulb/LED that lights up. For example, the participant needs to hit a button as soon as possible when this happens. Other indications may appear to serve as distraction. For example, if a red light bulb/LED lights up instead of (or in addition to) the green light, the driver should not react and simply ignore it.

In one example, this DRT test is performed 4 times in total, corresponding to 4 parts in the driving route:

> before starting the trip along the route;
> at the first checkpoint (after the urban driving stage);
> at the second checkpoint (after the mixed driving stage);
> at the third checkpoint (after the highway driving stage);
> after the end of the trip, e.g. upon arrival at the final stop.

Variations are possible, depending on the exact route, the position of checkpoints, and the number of stage, for example.

Each DRT may take a predetermined duration of time to complete, for example about 2.5 minutes each (between 2 and 3 minutes).

> Exemplary DRT settings include:
> Ratio of green (action) and red (stop) lights is 50/50;
> Intervals between successive stimuli are random, within a predetermined range (e.g. 1000 to 3000 ms, in steps of 150 ms);
> Order of appearance of green and red lights is random.

For safety reasons, DRTs are preferably only performed when the vehicle is at a stop.

DRT measurements are sensitive to the test subject's overall mental workload, and DRT metrics are used to differentiate attentional loads. Normally, three DRT variants can be used: Head-mounted DRT (HDRT), Remote DRT (RDRT), and Tactile DRT (TDRT). In the present experiment protocol, the DRT stimulus is visually presented. DRT performance includes three metrics: response time, number of false alarms, and number of passes.

Before or at the beginning of the experiment, the participant is preferably asked to fill in a first questionnaire (type 1) concerning his (or her) current well-being, anxiety level, previous sleep conditions, smoking, eating, consumption of caffeine, alcohol, medical prescription drugs and any other substances that may affect driving performance, etc.

During the stops, the participant is preferably instructed to fill further questionnaires (type 2) in order to provide self-assessed information, preferably after each DRT test. Here information to be provided comprises, for example:

> drowsiness on a 9-level Karolinska Sleepiness Scale (KSS);

cognitive load (NASA task load index (NASA-TLX), e.g. 9 levels);

emotional arousal and valence (self-assessment manikin (SAM) assessment);

stress level e.g. before and after each stage of the driving experiment.

At the end of the experiment there is preferably a final questionnaire (type 3) to be filled, concerning demographic and medical questions for instance.

The Test Session

The testing protocol and thus its results are optimised to ensure the lack of cognitive distraction, undue influences and implications, and psychological biases. Distractions should be avoided or at least minimised; the subject may thus be instructed to avoid activities that influence alertness when driving, in the different road conditions. For example, the subject may be instructed not to talk with another person (e.g. on a phone) or listen to music while driving. Furthermore, conversations shortly before the driving starts, especially anything that may create a bias in the subject's mind as to his upcoming experience or feelings (e.g. of tiredness), are preferably also be avoided. Rate of success in collection of reliable, clean data is therefore improved.

Experimental timings—total duration of the experiment, duration of the main driving process, duration of the DRT tasks, etc.—are of importance. For example, routes have chosen so that the total driving period can be considered to strike a balance between abundance and reliability of data collected, against equipment limitations and cost; there are multiple factors that affect the total duration that the driver is asked to drive for, for example. These factors may concern limitations imposed by engineering, human psychology and physiology, which need to be taken into account during an optimisation process. For example, if the duration of driving is unduly shortened, one may have to make assumptions that human mental/cognitive states switch instantaneously, which would negatively affect the quality of subsequent analysis.

An example of the experimental protocol, involving events and their timings, is provided in Appendix 1. This protocol including parameters such as length of each phase and test, and the order in which the phases/tests are carried out, has been identified by the inventors as an optimum or particularly preferable method of driving data collection. However, departures from the values indicated in Appendix 1 are possible without affecting the reliability of the data acquired.

In the protocol, rest periods may be included before and after the main driving task, in the following order:

first rest period of about 3 minutes;

on-road driving period (duration dependent on route, but preferably between 30 and 90 minutes not including stops, preferably between 45 and 75 minutes, more preferably about 60 minutes);

final rest period of about 3 minutes.

In other words, the subject may be instructed to provide self-assessed data, subjectively rating his own psychological state based on his knowledge or perception related thereto, e.g. previous sleep quality, current level of tiredness or stress.

Further Experimental Preparations and Precautions

Before the experiment, in some examples, the following preparations may be asked of the participating driver:

change the duration of night sleep before the day of experiment from their usual duration, e.g. reduce it to 3 hours;

avoid consumption of foods and drinks that contain caffeine and any drowsiness-causing medications for at least 8 hours before the experiment;

avoid smoking or physical exertion for at least 2 hours before the experiment.

Explicit consent may be obtained from the driver for taking part in the experiment voluntarily and having his data collected. Other checks as to general health, neurological well-being, vision (e.g. colour blindness), any medication being taken (e.g. psychoactive medication), language skills and driving license status (e.g. at least one year from driving license acquisition) may also be done.

Apparatus and Environment Configuration

The apparatus used in the experiment according to the present embodiment is now described.

The vehicle used in this on-road data collection session is preferably a "normal" vehicle that is fitted with suitable data collection means. For example, it is instrumented with a customised data acquisition system for time-synchronised recording of vehicular information from the steering wheel and pedals, and a physiological monitoring unit for the driver's bio-data, and a series of cameras for tracking various aspects of driver behaviour and the surrounding driving environment. The vehicle preferably includes geo-location means to track the vehicle in real time and assist guiding the driver along the predetermined test route.

Some equipment may be installed fixedly in the car interior; some may be attached to the participant's body. The following apparatuses may be included in the setup:

one or more cameras to monitor the subject;

one or more (e.g. two) eye-tracking cameras (e.g. Smart Eye);

a plurality (e.g. two) photoplethysmography sensors in watches to be worn by the subject (e.g. Samsung Watch) to collect blood circulation data;

an ECG-telemetry system with chest electrodes and the respiration curve measurement with a strain-gauge type pickup sensor to be worn by the subject (e.g. Zephyr Technology, BioHarness);

one or more (e.g. two) conventional laptop PCs.

The plurality of sensing/detection/measurement means may be thought of as falling into two groups: primary sensors, which are used as a source of information in a production-like environment, e.g. a camera that captures the subject's facial features to help determine his level of drowsiness, which is the focus of the experiment; and secondary sensors, which are auxiliary detectors for better understanding the state of the subject or of the environment he is in, such as a humidity sensor for collecting environmental information. Collection of data by all the separate components is synchronous.

The vehicle setup preferably also includes cognition test apparatus, for example a dedicated module or panel including the aforementioned visual stimuli, e.g. green and red light bulbs that can light up in a DRT, and test response input means e.g. a button, for the test subject to activate as his (or her) reaction. It may be attached or integrated into the car e.g. at or near or above the dashboard/car driving panel.

Data Collection and Analysis

The human physiological data collected during the experiment includes at least one of:

Heart rate/electrocardiogram (ECG):

This can be collected by sensors such as wearable body sensors/monitors, such as watches, straps, patches, harnesses, shirts, etc. with sensing capabilities (e.g. Zephyr sensor, Samsung watch sensor). This can also be collected using remote photoplethysmography (rPPG) using video equipment monitoring the driver's face.

Eye movements;

Respiration.

More specifically, parameters of interest that could be collected, measured, or derived from collected data include one or more of:

RR intervals from the ECG;

respiration waveform;

respiration rate calculated from the peak-to-peak interval of the respiration curve;

right-and-left eye gaze;

eyelid closure.

Examples of collection of particular types of data are described below.

ECG (electrocardiogram) equipment and data collection: ECG and RR-intervals (the time periods between consecutive heartbeats) may be measured using a miniature ECG sensor (e.g. BioHarness, at sampling rate 1000 Hz, by Zephyr Technology, Annapolis, MD, USA). The subject may wear a special chest belt with two electrodes that are located in the first and second chest leads. Batch data transmission from the sensor to a mobile device may be carried out through a wireless protocol e.g. Bluetooth.

Eye gaze recording equipment and data collection: Eye gaze data may be recorded using a wearable eye gaze tracker (e.g. commercially available eye gaze tracker Smart Eye DR120). Two cameras for gaze tracking may be installed within a horizontal bar attached to the bottom of the central screen above the steering wheel, to measure eye data samples at 120 Hz, although these are preferably downsampled to 60 Hz by software.

Face video recording: To capture face expressions from the driver and rPPG signal, a web camera (e.g. Logitech webcam) may be used, pointed straight at the participant from the screen, capturing video at 30 frames-per-second (FPS). Preferably, for the analysis of rPPG, the camera may be positioned to capture the driver's whole head and upper torso with sufficient margins to keep the face in view, as he may show normal forward-oriented movements while driving. Preferably, the video capture is in black and white and the video resolution is 1920×1080.

Non-physiological data measured and collected.

Data collected at different components of the experimental set up, may be transmitted via transmission means (wirelessly or otherwise) to storing means and/or processing means such as a computer, a server and/or a processor, such as the aforementioned laptop(s), or external computing means.

Processing of Collected Data

In accordance with any of the above disclosure, data can be collected in a consistent way following a predetermined test protocol, for exploring mental states of a driver in connection with environmental and road conditions.

The data, after being collected by the detection/data collection means such as medical sensors, monitors and cameras, may be transmitted to suitable processing means (e.g. computer processor, microprocessor, server in a computing system) and storing means (e.g. a memory in the system). The data may be analysed by the processing means, in order to determine the psychophysiological state of the subject. The results can be useful in informing the development of assisted driving software and hardware, such as serving as training data for machine-learning algorithms for determining the psychological state (e.g. level of drowsiness) of a driver in correlation with his (or her) observable bio-signals, data on response to distractions and mental exercise, and vehicle data.

System

Figure 2:
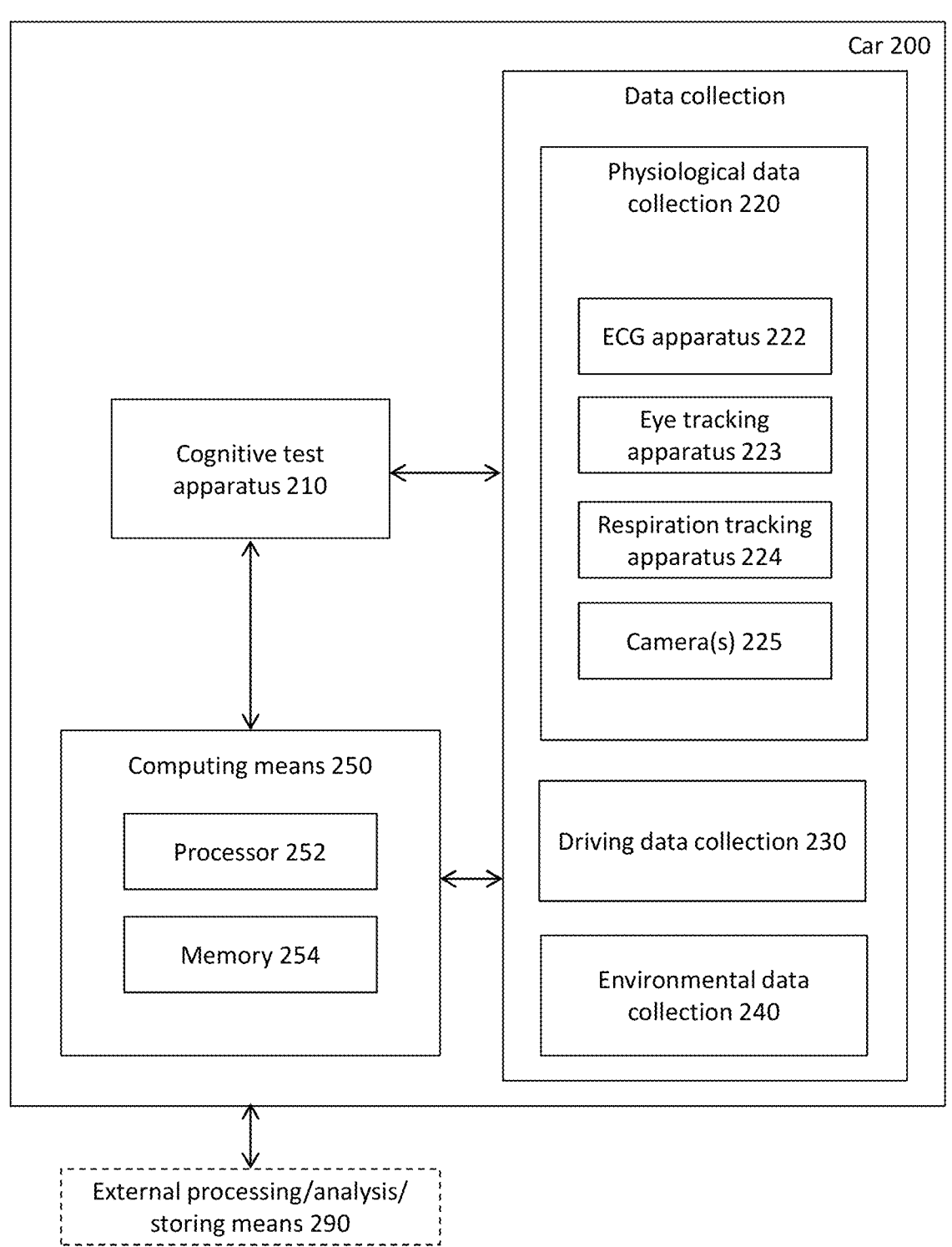
FIG. 2 is a block diagram for a system in accordance with an example.

In accordance with one embodiment, FIG. 2 depicts a block diagram for a system for carrying out a driving test to collect data on the driver with a view to understand the driver's mental state under varied driving conditions, such as those represented in a monotonous highway driving scenario, a relatively complex urban street driving scenario, and somewhere in between.

The system preferably comprises an automotive vehicle 200. It preferably comprises a cognitive test apparatus 210 for implementing a cognitive test to be performed during the experiment such as a DRT.

It may also comprise data collection means, including means for obtaining/detecting/measuring physiological data 220 of the driver, means for obtaining/detecting/measuring driving (driver behaviour) data 230, and means for obtaining/detecting/measuring simulator environment data 240.

The physiological data collection means 220 may include ECG apparatus 222, eye tracking apparatus 223, respiration tracking apparatus 224, at least one camera(s) 225, and other further sensors (not illustrated).

The system may also comprise computing means 250, which includes at least one processor(s) or (micro) processor(s) 252, and storing means (memory) 254. The processor(s) may be responsible for performing analysis on collected data. Alternatively, analysis may be performed in external computing means.

The various components and means within the simulator system are preferably connected to each other and operable to communicate with one another.

Optionally, there is provided external processing, analysis and/or storing means 290, such as a server, processor and/or memory, for performing at least part of the processing, analysis and/or storage. This is connected to the car simulator.

Some of the above components may be optional.

Methods

FIG. 3 is a flow chart illustrating a method 300 disclosed in accordance with one of many aspects of the present disclosure. The method includes step 310: collecting data throughout a driving session, wherein the driving session comprises driving on a predetermined route by a driver in an automotive vehicle, wherein the predetermined route is divided into a plurality of route sections comprising a first route section having a first driving environment and a second route section having a second environment, wherein one of the first and second driving environments is a higher-complexity driving environment and the other of the first and second driving environments is a lower-complexity driving environment;

wherein the driving session comprises a plurality of driving breaks, each break following immediately after driving in a respective route section is complete, wherein during each driving break a respective detection response task (DRT) is performed by the driver, wherein each DRT comprises the driver reacting to at least one visual stimulus; this step comprises step 312: collecting, by a plurality of detection means, physiological data on the driver throughout the predetermined time period; wherein the physiological data collected comprises at least one of: heart rate data, eye movement data, and respiration data, and step 314: collecting driver behaviour data, comprising recording the driver's reaction to the at least one visual stimulus during the plurality of DRTs. The method subsequently includes, optionally, step 320: analysing the physiological data and the driver behaviour data to determine a psychophysiological state of the driver during the driving session.

FIG. 4 is a flow chart illustrating a method 400 in accordance with another aspect of the disclosure. The method comprises optional step 410: instructing a test subject to submit first self-reported data (e.g. using a first questionnaire); optional step 420: instructing the test subject to submit second self-reported data (e.g. using a second questionnaire); optional step 430: instructing the test subject to rest for a first resting duration; optional step 440: instructing the test subject to perform an initial DRT; step 450: instructing the test subject to drive in a first route section (of a predetermined route) having a first driving environment; step 452: instructing the test subject to perform a first DRT in a first driving break after driving in the first route section is complete; optional step 454: instructing the test subject to submit second self-reported data (e.g. using another second questionnaire); step 460: instructing the test subject to drive in a second route section (of the predetermined route) having a second driving environment, wherein one of the first and second driving environments is a higher-complexity driving environment and the other of the first and second driving environments is a lower-complexity driving environment; step 462: instructing the test subject to perform a second DRT in a second driving break after driving in the second route section is complete; optional step 464: instructing the test subject to submit second self-reported data (e.g. using yet another second questionnaire); step 470: collecting data throughout the driving in the predetermined driving route, comprising sub-step 472: collecting, using a plurality of detection means, physiological data on the driver throughout the predetermined time period; wherein the physiological data collected comprises at least one of: heart rate data, eye movement data, and respiration data, and sub-step 474: collecting driver behaviour data, comprising recording the driver's reaction to at least one visual stimulus during the plurality of DRTs. The method further comprises optional step 480: instructing the test subject to rest for a second resting duration, and optional step 490: instructing the test subject to submit third self-reported data (e.g. using a third questionnaire). In this method, the driving test takes place in a real automotive vehicle.

FIG. 5 is a flow chart illustrating a method 500 in accordance with another aspect of the disclosure. The method comprises optional step 510: providing first self-reported data (e.g. using a first questionnaire); optional step 520: providing second self-reported data (e.g. using a second questionnaire); optional step 530: resting for a first resting duration; optional step 540: performing an initial DRT; step 550: driving in a first route section (of a predetermined route) having a first driving environment; step 552: performing a first DRT in a first driving break after driving in the first route section is complete; optional step 554: providing second self-reported data (e.g. using another second questionnaire); step 560: driving in a second route section (of the predetermined route) having a second driving environment (wherein one of the first and second driving environments is a higher-complexity driving environment and the other of the first and second driving environments is a lower-complexity driving environment); step 562: performing a second DRT in a second driving break after driving in the second route section is complete; optional step 564: providing second self-reported data (e.g. using yet another second questionnaire). Steps 510 to 564 are performed by a human driver. The method then comprises step 570: collecting, by collecting means, data throughout the driving in the predetermined driving route, comprising sub-step 572: collecting, using a plurality of detection means, physiological data on the driver throughout the predetermined time period; wherein the physiological data collected comprises at least one of: heart rate data, eye movement data, and respiration data, and sub-step 574: collecting driver behaviour data, comprising recording the driver's reaction to at least one visual stimulus during the plurality of DRTs. The method then comprises optional step 580: resting for a second resting duration; and optional step 590: providing third self-reported data (e.g. using a third questionnaire). Steps 580 to 590 are performed by the driver. In this method, the driving test takes place in a real automotive vehicle.

The present invention is not to be limited by the above-described aspects and embodiments, and that many variations are within the scope of the appended claims. The various aspects and embodiments may be combined if necessary and appropriate. The drawings serve as exemplary illustrations of the invention only, to aid understanding of the invention.

APPENDIX 1

Timings according to an experimental protocol:

| Duration | Stage |
| --- | --- |
| ~10 min | Questionnaire (type 1) + Questionnaire (type 2) |
| 3 min | Rest + Closed eyes |
| 1 min | DRT in the beginning |
| ~15 min | Urban driving stage |
| 2.5 min | DRT at checkpoint 1 |
| ~3 min | Questionnaire (type 2) |
| ~15 min | Mixed driving stage |
| 2.5 min | DRT at checkpoint 2 |
| ~3 min | Questionnaire (type 2) |
| ~15 min | Highway driving stage |
| 2.5 min | DRT at checkpoint 3 |
| ~3 min | Questionnaire (type 2) |
| ~15 min | Mixed driving stage |
| 2.5 min | DRT at the end |
| ~3 min | Questionnaire (type 2) |
| 3 min | Rest + Closed eyes |
| ~20 min | Questionnaire (type 3) |

In the above table, as the protocol depends on the route specific to an experiment, the duration for the various driving stages are indicated only as an illustration of an example, but each driving stage preferably lasts about 15 minutes (i.e. between 10 and 20 minutes, or between 5 and 25 minutes); the "DRT" section at the beginning is indicated to last 1 minute, but this may alternatively be any duration between 0.5 and 2 minutes; each of the other DRT sessions is indicated to last 2.5 minutes, but this may alternatively be any duration between 1.5 and 3.5 minutes, more preferably 2 to 3 minutes; each rest period indicated to last 3 minutes may alternatively be any duration between 2 and 5 minutes; the indicated timings for the test subject to complete each of the questionnaires are also approximate.

The invention claimed is:

1. A method of collecting data for determining a psycho-physiological state of a human driver, comprising:
   collecting data throughout a driving session, wherein the driving session comprises driving on a predetermined route by a driver in an automotive vehicle, wherein the predetermined route is divided into a plurality of route sections comprising a first route section having a first driving environment and a second route section having a second environment, and wherein one of the first and second driving environments is a higher-complexity driving environment and the other of the first and second driving environments is a lower-complexity driving environment;

wherein the driving session comprises a plurality of driving breaks, each break following immediately after driving in a respective route section is complete, wherein during each driving break a respective detection response task (DRT) is performed by the driver, wherein each DRT comprises the driver reacting to at least one visual stimulus; and wherein said collecting data comprises:

collecting, by a plurality of detection means, physiological data on the driver throughout a predetermined time period; wherein the physiological data collected comprises at least one of: heart rate data, eye movement data, and respiration data; and collecting driver behaviour data, comprising:

recording the driver's reaction to the at least one visual stimulus during the plurality of DRTs.

2. The method in accordance with claim 1, wherein the plurality of route sections further comprises a third route section having a third driving environment, wherein the third driving environment is an intermediate-complexity driving environment.

3. The method in accordance with claim 1, wherein the higher-complexity driving environment is an urban environment, and the lower-complexity driving environment is a highway environment.

4. The method in accordance with claim 1, wherein the each DRT comprises the driver reacting to the at least one visual stimulus, and wherein said recording the driver's reaction comprises at least one of: recording a response time of the user in reaction to a visual stimulus, a number of correct responses, and a number of incorrect responses.

5. The method in accordance with claim 4, wherein in at least one of the plurality of DRTs, at least one false stimulus is provided to the driver that the driver is instructed to ignore; wherein the visual stimulus comprises a visual indication in a first colour, and the false stimulus comprises a visual indication in a second colour different from the first colour.

6. The method in accordance with claim 1, wherein a duration to complete driving in each of the plurality of route sections is between 10 and 20 minutes, and/or wherein each of the plurality of DRTs has a duration of between 2 and 3 minutes.

7. The method in accordance with claim 1, wherein an initial DRT is performed before driving begins.

8. The method in accordance with claim 1, wherein the driving session takes place after a first period of rest by the driver for a first predetermined duration, and a second period of rest by the driver for a second predetermined duration takes place after the driving session.

9. The method in accordance with claim 8, further comprising:

collecting self-reported data before the first period of rest and after the second period of rest.

10. The method in accordance with claim 1, further comprising:

collecting self-reported data from the driver in each of the driving breaks after the respective DRT in each driving break, the self-reported data comprising data on at least one of: the driver's psychological state, physical state and prior sleep conditions.

11. The method in accordance with claim 1, further comprising, before said collection of data, selecting a suitable route comprising multiple sections of different environments corresponding to different levels of complexities based on previously collected data on a plurality of potential routes.

12. The method in accordance with claim 1, wherein the plurality of detection means comprises at least one of: an electrocardiogram (ECG) apparatus for obtaining heart rate data, at least one eye-tracking camera for obtaining eye movement data, at least one camera for obtaining video data of the driver's face, and at least one photoplethysmography sensor to collect blood circulation data.

13. The method in accordance with claim 11, further comprising:

analysing the physiological data and the driver behaviour data to determine a psychophysiological state of the driver during the driving session.

14. The method in accordance with claim 13, wherein analysing the physiological data and driver behaviour data comprises storing the collected data in a memory and/or sending the collected data to a processor for analysis.

15. A system for collecting data for determining a psychophysiological state of a human driver, comprising:

means for collecting data throughout a driving session, wherein the driving session comprises driving on a predetermined route by a driver in an automotive vehicle, wherein the predetermined route is divided into a plurality of route sections comprising a first route section having a first driving environment and a second route section having a second environment, and wherein one of the first and second driving environments is a higher-complexity driving environment and the other of the first and second driving environments is a lower-complexity driving environment;

wherein the driving session comprises a plurality of driving breaks, each break following immediately after driving in a respective route section is complete, wherein during each driving break a respective detection response task (DRT) is performed by the driver, and wherein each DRT comprises the driver reacting to at least one visual stimulus;

wherein the means for collecting data comprises:

a plurality of detection means for collecting physiological data on the driver throughout a predetermined time period; wherein the physiological data collected comprises at least one of: heart rate data, eye movement data, and respiration data; and means for collecting driver behaviour data, comprising:

recording the driver's reaction to the at least one visual stimulus during the plurality of DRTs.

16. A method of collecting data for determining a psychophysiological state of a human driver, comprising:

collecting data throughout a driving session, wherein the driving session comprises driving on a predetermined route by a driver in an automotive vehicle, wherein the predetermined route is divided into a plurality of route sections comprising a first route section having a first driving environment and a second route section having a second environment, and wherein one of the first and second driving environments is a higher-complexity driving environment and the other of the first and second driving environments is a lower-complexity driving environment;

wherein the driving session comprises a plurality of driving breaks, each break following immediately after driving in a respective route section is complete, wherein during each driving break a respective detection response task (DRT) is performed by the driver, wherein each DRT comprises the driver reacting to at least one visual stimulus; and wherein said collecting data comprises:

collecting, by a plurality of detection means, physiological data on the driver throughout a predetermined time period; wherein the physiological data collected comprises one or more of the following: heart rate data, eye movement data, and respiration data; and collecting driver behaviour data, comprising:

recording the driver's reaction to the at least one visual stimulus during the plurality of DRTs.

* * * * *